US008542782B2

(12) United States Patent
Cheng et al.

(10) Patent No.: US 8,542,782 B2
(45) Date of Patent: Sep. 24, 2013

(54) CIRCUIT FOR DETECTING A DIGITAL DATA STREAM AND ASSOCIATED METHOD

(75) Inventors: Kai-Wen Cheng, Hsinchu Hsien (TW); Ko-Yin Lai, Hsinchu Hsien (TW); Yi-Ying Liao, Hsinchu Hsien (TW); Tai-Lai Tung, Hsinchu Hsien (TW)

(73) Assignee: MStar Semiconductor, Inc. (TW)

(*) Notice: Subject to any disclaimer, the term of this patent is extended or adjusted under 35 U.S.C. 154(b) by 763 days.

(21) Appl. No.: 12/765,583

(22) Filed: Apr. 22, 2010

(65) Prior Publication Data

US 2010/0296002 A1 Nov. 25, 2010

Related U.S. Application Data

(60) Provisional application No. 61/180,126, filed on May 20, 2009.

(51) Int. Cl.
*H03D 1/00* (2006.01)

(52) U.S. Cl.
USPC ...................... 375/343; 348/725; 348/E5.106

(58) Field of Classification Search
USPC ............................ 375/343, 725; 348/E5.108
See application file for complete search history.

(56) References Cited

U.S. PATENT DOCUMENTS 5,247,470 A * 9/1993 McKown et al. ............ 708/314

OTHER PUBLICATIONS

ETSI EN 302 755 V1.1.1 (Sep. 2009) European Standard (Telecommunications series); Digital Video Broadcasting (DVB); Frame structure channel coding and modulation for a second generation digital terrestrial television broadcasting system (DVB-T2) http://www.etsi.org/deliver/etsi_en/302700_302799/302755/01.01.01_60/en_302755v010101p.pdf.*

ETSI TS 102 831 V1.1.1 (Oct. 2010) Technical Specification; Digital Video Broadcasting (DVB); Implementation guidelines for a second generation digital terrestrial television broadcasting system (DVB-T2) http://www.etsi.org/deliver/etsi_ts/102800_102899/102831/01.01.01_60/ts_102831v010101p.pdf.*

* cited by examiner

*Primary Examiner* — Khanh C Tran
*Assistant Examiner* — Nader Bolourchi
(74) *Attorney, Agent, or Firm* — Han IP Corporation

(57) ABSTRACT

A circuit for detecting a digital data stream includes a first detecting circuit, a second detecting circuit and a decision unit. The digital data stream includes a predetermined symbol having a first data and a second data. The first detecting circuit detects a correlation between the second data and a first frequency-shifted data to generate a first correlated data; and the second detecting circuit detects a correlation between the second data and a second frequency-shifted data to generate a first correlated data, where the first frequency-shifted data and the second frequency-shifted data are generated by performing first frequency-shifting and second frequency-shifting upon the first data, respectively. The decision unit determines a signal status of the digital data stream according to the first and second correlated data.

18 Claims, 6 Drawing Sheets

CIRCUIT FOR DETECTING A DIGITAL DATA STREAM AND ASSOCIATED METHOD

CROSS REFERENCE TO RELATED PATENT APPLICATIONS

This patent application claims priority to Provisional Application No. 61/180,126, filed on May 20, 2009.

TECHNICAL FIELD

The present disclosure relates to a circuit for detecting a digital data stream and an associated method, and more particularly, to a circuit for detecting whether a cosine component and a sine component in a digital data stream are swapped, called IQ swap, and for detecting a carrier frequency offset in the digital data stream, and an associated method.

BACKGROUND OF THE DISCLOSURE

In the Digital Video Broadcasting over Terrestrial 2 (DVB-T2) system, since various spectrum reverse operations may be involved during signal processing, a signal received from an antenna may be a correct spectrum or a reversed spectrum, and the reversed spectrum is equivalent to swapping cosine and sine components in the correct spectrum in the time-domain. To prevent errors from occurring during subsequent data demodulation due to the signal with a reversed spectrum, the receiver first determines whether the received signal is a correct or reversed spectrum and then switches connections of a multiplexer accordingly to transmit the correct signals to subsequent processing circuits—such approach however needs a rather longer detection time to undesirably affect processing performance of the receiver.

Further, orthogonal frequency-division multiplexing (OFDM) is implemented in the DVB-T2 system, and thus significant inter-carrier interference (ICI) is present in the receiver. To lower the ICI, the receiver generally adopts a circuit for improving carrier frequency offset. Therefore, it is an important task to provide a circuit with a minimal cost and a method with optimal efficiency for improving the carrier frequency offset.

SUMMARY OF THE DISCLOSURE

It is an object of the present disclosure to provide a circuit for detecting a digital data stream and an associated method, which are capable of quickly detecting whether cosine and sine components in the digital data stream are swapped, called IQ swapped, while also detecting a carrier frequency offset of the digital data stream to overcome the foregoing issues.

A circuit for detecting a digital data stream comprising a predetermined symbol is provided according to one embodiment of the present disclosure. The predetermine symbol comprises a first data and a second data, and the first data is generated by performing frequency shifting upon the second data. The circuit comprises a first detecting circuit, a second detecting circuit and a decision unit. The first detecting circuit is for detecting correlation between a first frequency-shifted data and the second data to generate a first correlated data, wherein the first frequency-shifted data is generated by performing first frequency shifting upon the first data. The second detecting circuit is for detecting correlation between a second frequency-shifted data and the second data to generate a second correlated data, wherein the second frequency-shifted data is generated by performing second frequency shifting upon the first data. The decision unit is for determining a signal status of the digital data stream according to the first and second correlated data.

A method for detecting a digital data stream comprising a predetermined symbol is provided according to another embodiment of the present disclosure. The predetermine symbol comprises a first data and a second data, and the first data is generated by performing frequency shifting upon the second data. The method comprises calculating correlation between a first frequency-shifted data and the second data to generate a first correlated data, wherein the first frequency-shifted data is generated by performing first frequency shifting upon the first data; calculating correlation between a second frequency-shifted data and the second data to generate a second correlated data, wherein the second frequency-shifted data is generated by performing second frequency shifting upon the first data; and determining a status of the digital data stream according to the first and the second correlated data.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

Figure 1:
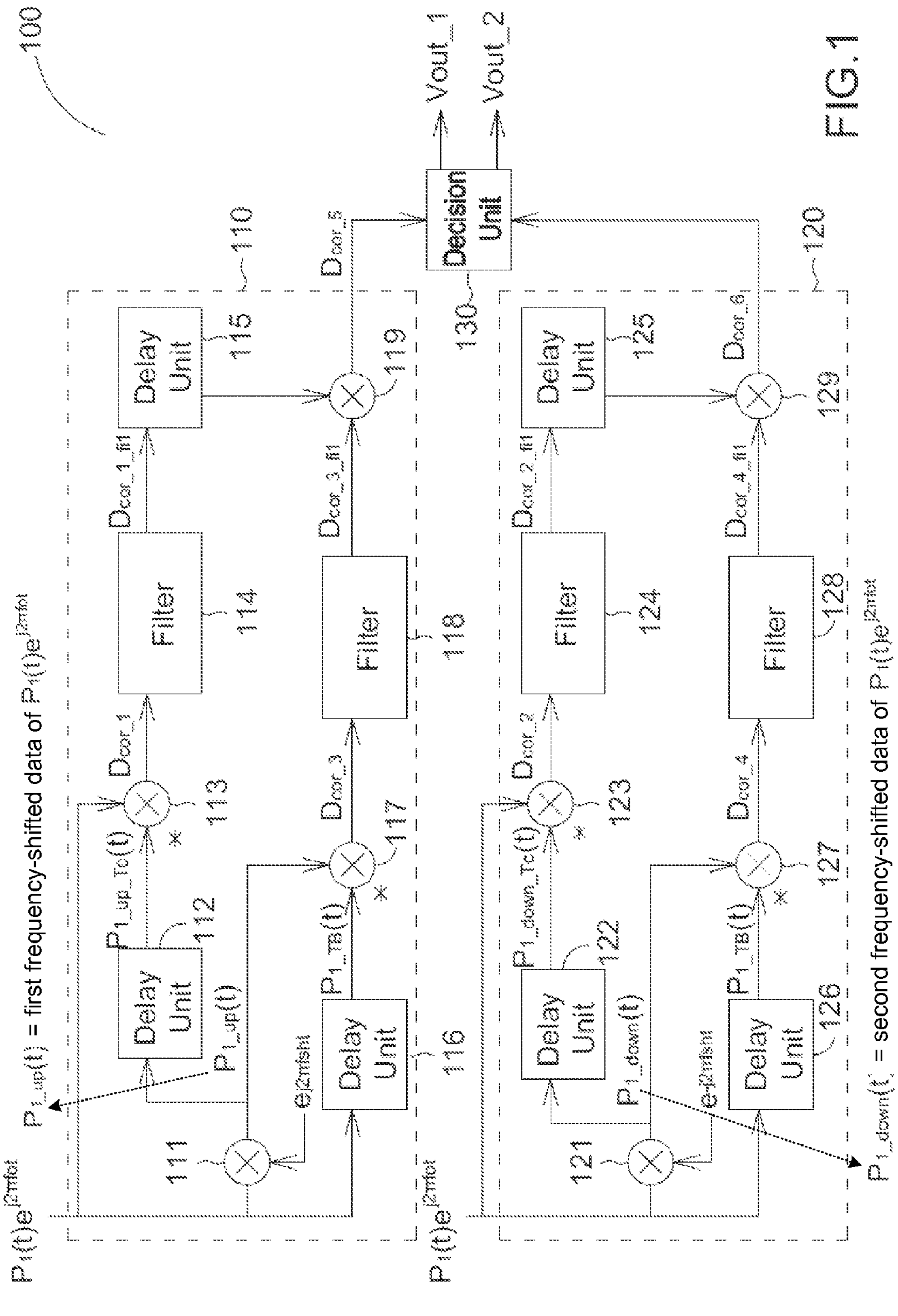
FIG. 1 is a schematic diagram of a circuit for detecting a digital data stream according to one embodiment of the present disclosure.

FIG. 1 shows a schematic diagram of a circuit 100 for detecting a digital data stream according to one embodiment of the present disclosure. As shown, the circuit 100 comprises a first detecting circuit 110, a second detecting circuit 120 and a decision unit 130. The first detecting circuit 110 comprises a frequency shifter 111, three delay units 112, 115 and 116, two correlators 113 and 117, two filters 114 and 118, and a multiplier 119. The second detecting circuit 120 comprises a frequency shifter 121, three delay units 122, 125 and 126, two correlators 123 and 127, two filters 124 and 128, and a multiplier 129. In this embodiment, the circuit 100 is applied to a DVB-T2 system, the frequency shifter 111 has a frequency offset of $f_{sh}$, and the frequency shifter 121 has a frequency offset of $-f_{sh}$, where $f_{sh}$ is 1/1024T and T is a sampling cycle of the digital data stream.

Figure 2:
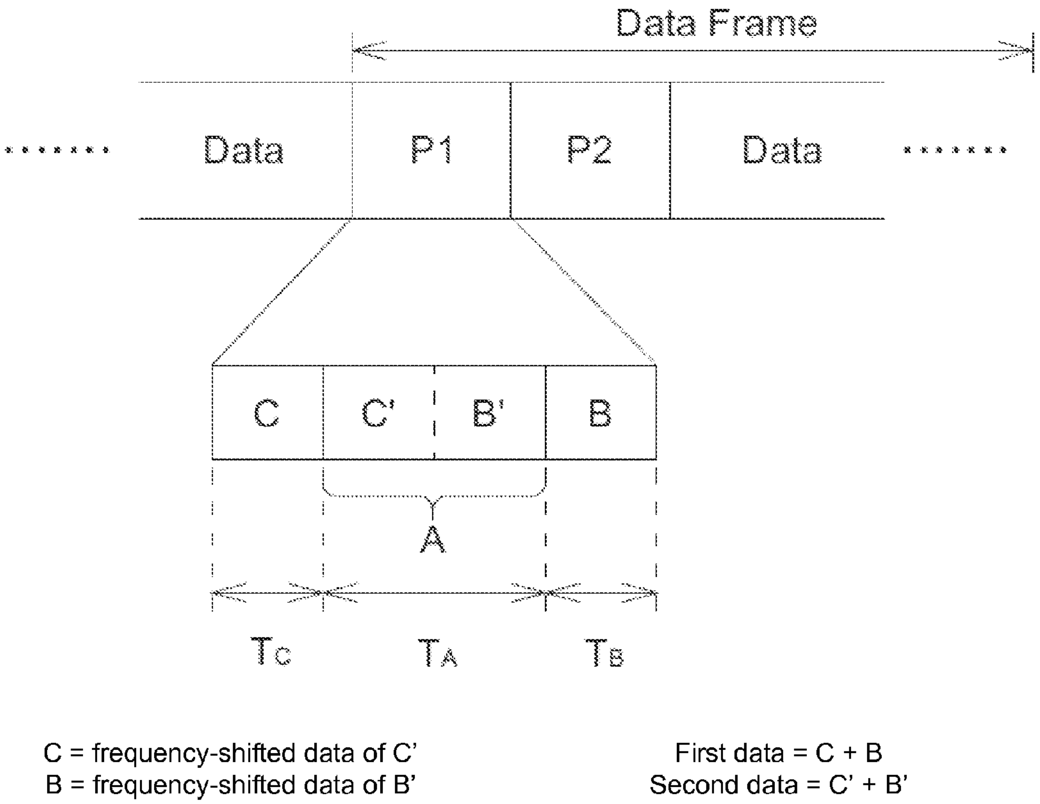
FIG. 2 is a schematic view of a DVB-T2 compliant digital data stream containing a P1 symbol.

In one embodiment of the present disclosure, delays of the delay units 112, 115 and 116, and window lengths of the filters 114 and 118 of the first detecting circuit 110, and delays of the delay units 122, 125 and 126, and window lengths of the filters 124 and 128 of the second detecting circuit 120 are determined based on the digital data stream and a format of a P1 symbol of the DVB-T2 specification. FIG. 2 is a schematic diagram of a DVB-T2 compliant digital data stream comprising a P1 symbol. As shown, a data frame comprises a P1 symbol, a P2 symbol and data. The P1 symbol is mainly consisted of three data in sequence, namely a data C with 542 samples and a time length of $T_C$, a data A with 1024 samples and a time length of $T_A$, and a data B with 482 samples and a time length of $T_B$. Further, the data C is a frequency-shifted data generated by performing frequency shifting upon a first half of the data A (i.e., a data C'), and the data B is a frequency-shifted data generated by performing frequency shifting upon a second half of the data A (i.e., a data B'). An equation for the P1 symbol $p_1(t)$ is as below:

$$p_1(t) = \begin{cases} p_{1A}(t)e^{i\frac{2\pi}{1024T}t} & 0 \le t < 542T \\ p_{1A}(t-542T) & 542T \le t < 1566T \\ p_{1A}(t-1024)e^{i\frac{2\pi}{1024T}t} & 1566T \le t < 2048T \\ 0 & \text{otherwise,} \end{cases}$$

where $p_{1A}$ is content of the data A, and T is a sampling cycle of the digital data stream. For example, the delay units 112 and 122 provide a delay of $T_C$ (i.e., a time of the 542 samples of the data C in the P1 symbol), the delay units 116 and 126 provide a delay of $T_B$ (i.e., a time of the 482 samples of the data B in the P1 symbol), and the delay units 115 and 125 provide a delay of $2*T_B$ (i.e., twice the time of the 482 samples of the data B in the P1 symbol). The filters 114 and 124 have a window length of approximately equal to the number of samples of the data C in the P1 symbol; that is, 542, any integer approximating 542, or a value of 2 to the power of n (e.g., 256, 512 or 1024). Similarly, the filters 118 and 128 have a window length of approximately equal to the number of samples of the data B in the symbol P1; that is, 482, any integer approximating 482, or a value of 2 to the power n (e.g., 256, 512 or 1024).

Figure 3:
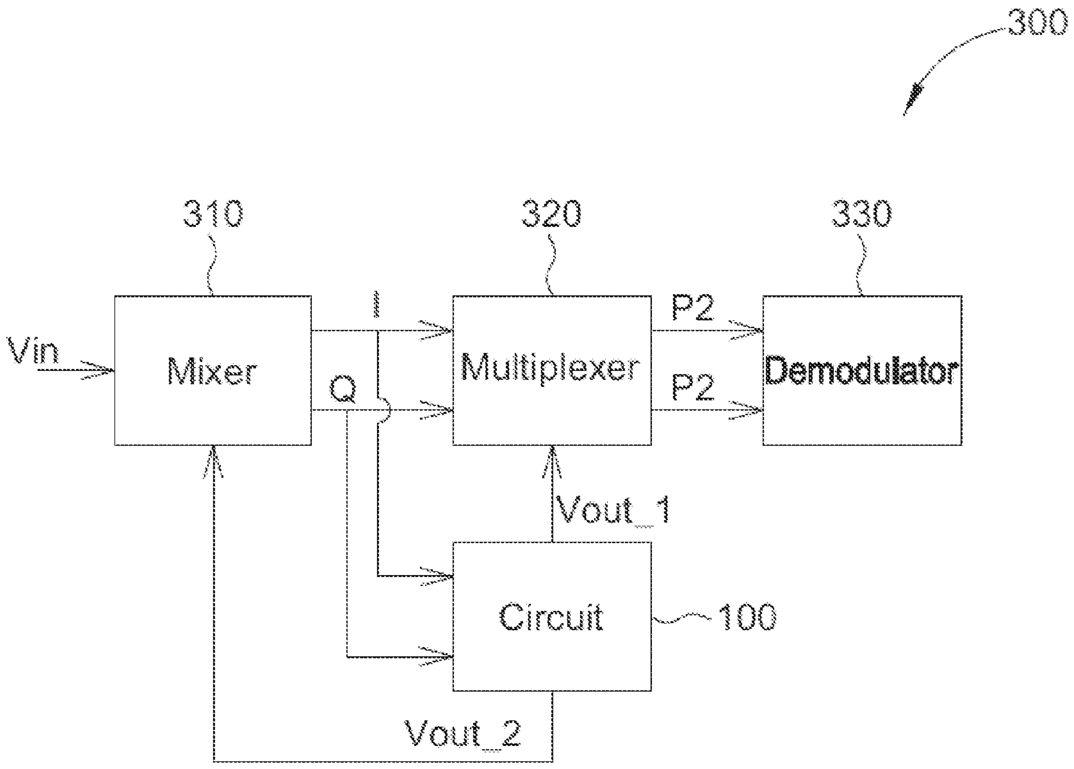
FIG. 3 is a schematic view of a DVB-T2 compliant receiver.

The circuit 100 may be applied to a DVB-T2 compliant receiver 300 shown in FIG. 3. As shown in FIG. 3, the receiver 300 comprises a mixer 310, a multiplexer 320, a demodulator 330 and the circuit 100 shown in FIG. 1. The mixer 310 receives an input signal Vin and outputs a cosine component I and a sine component Q to the multiplexer 320 and the circuit 100. The circuit 100 then determines whether the cosine component I and the sine component Q are swapped, and generates an output signal $V_{out\_1}$ to the multiplexer 320 to switch transmission paths. For example, when the circuit 100 determines that the cosine component I and the sine component Q are not swapped, the cosine component I is transmitted via a path P1 and the sine component is transmitted via a path P2 to a demodulator 330; when the circuit 100 determines that the cosine component I and the sine component Q are swapped, the cosine component I is transmitted via the path P2 and the sine component Q is transmitted via the path P1 to the demodulator 330. Further, the circuit 100 may also determine a carrier frequency offset of the input signal Vin according to the cosine component I and the sine component Q to generate an output signal $V_{out\_2}$ to an oscillator (not shown) in the mixer 310 to adjust the output carrier frequency.

Supposing the P1 symbol in the digital data stream is inputted into the circuit 100, either the first detecting circuit 110 or the second detecting circuit 120 generates a sharper peak. More specifically, the second detecting circuit 120 generates a sharper peak while no noticeable difference is observed at the output of the first detecting circuit 110 when the cosine component I and the sine component Q are not swapped; on the contrary, the first detecting circuit 110 generates a sharper peak while no noticeable difference is observed at the output of the second detecting circuit 120 when the cosine component I and the sine component Q are swapped. Therefore, by comparing the amplitude of the output signals from the first detecting circuit 110 and the second detecting circuit 120, it is determined whether the cosine component I and the sine component Q are swapped.

Figure 4A:
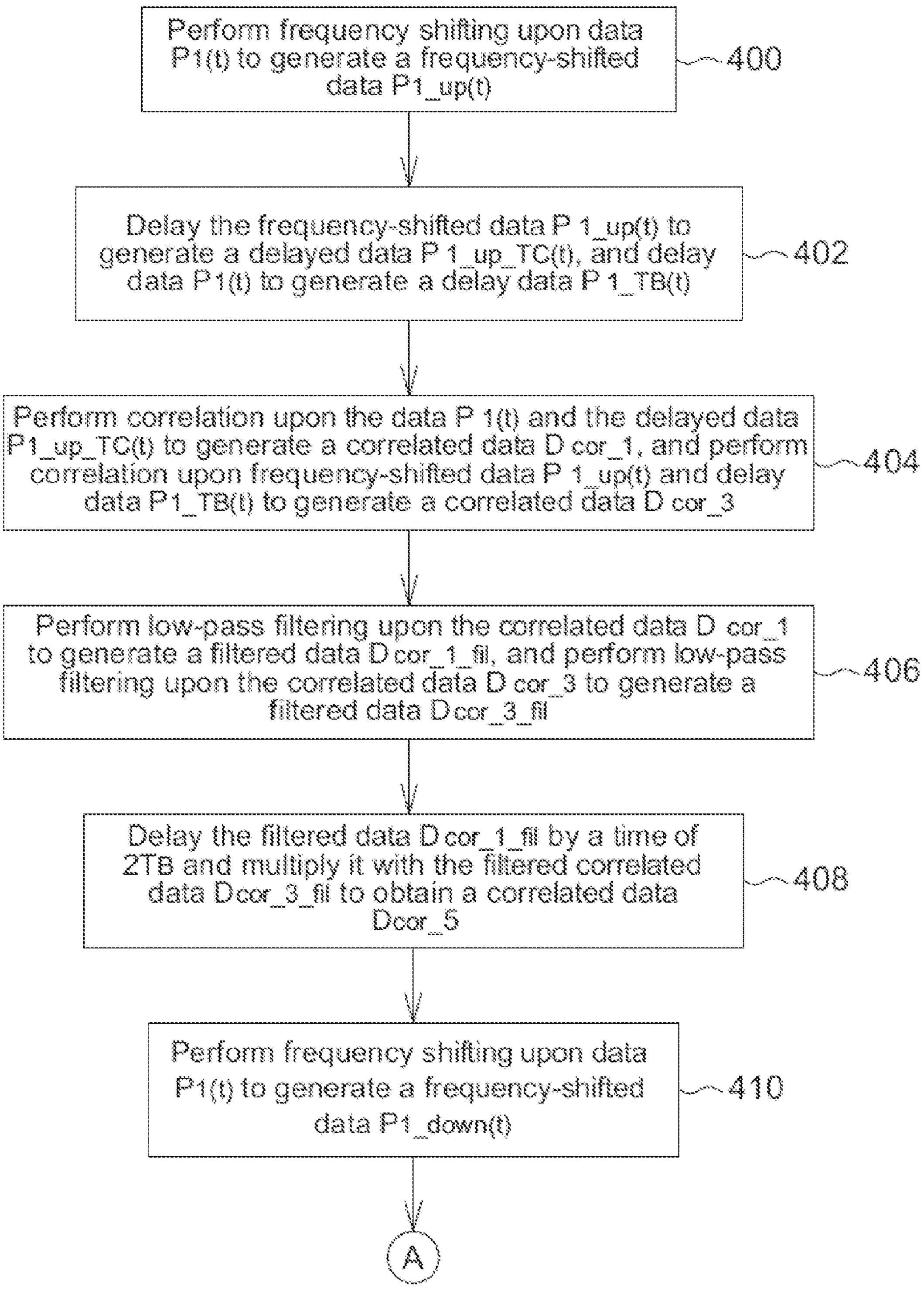
FIGS. 4*a* and 4*b* are flowcharts of a method for detecting a digital data stream according to one embodiment of the present disclosure.
Figure 4B:
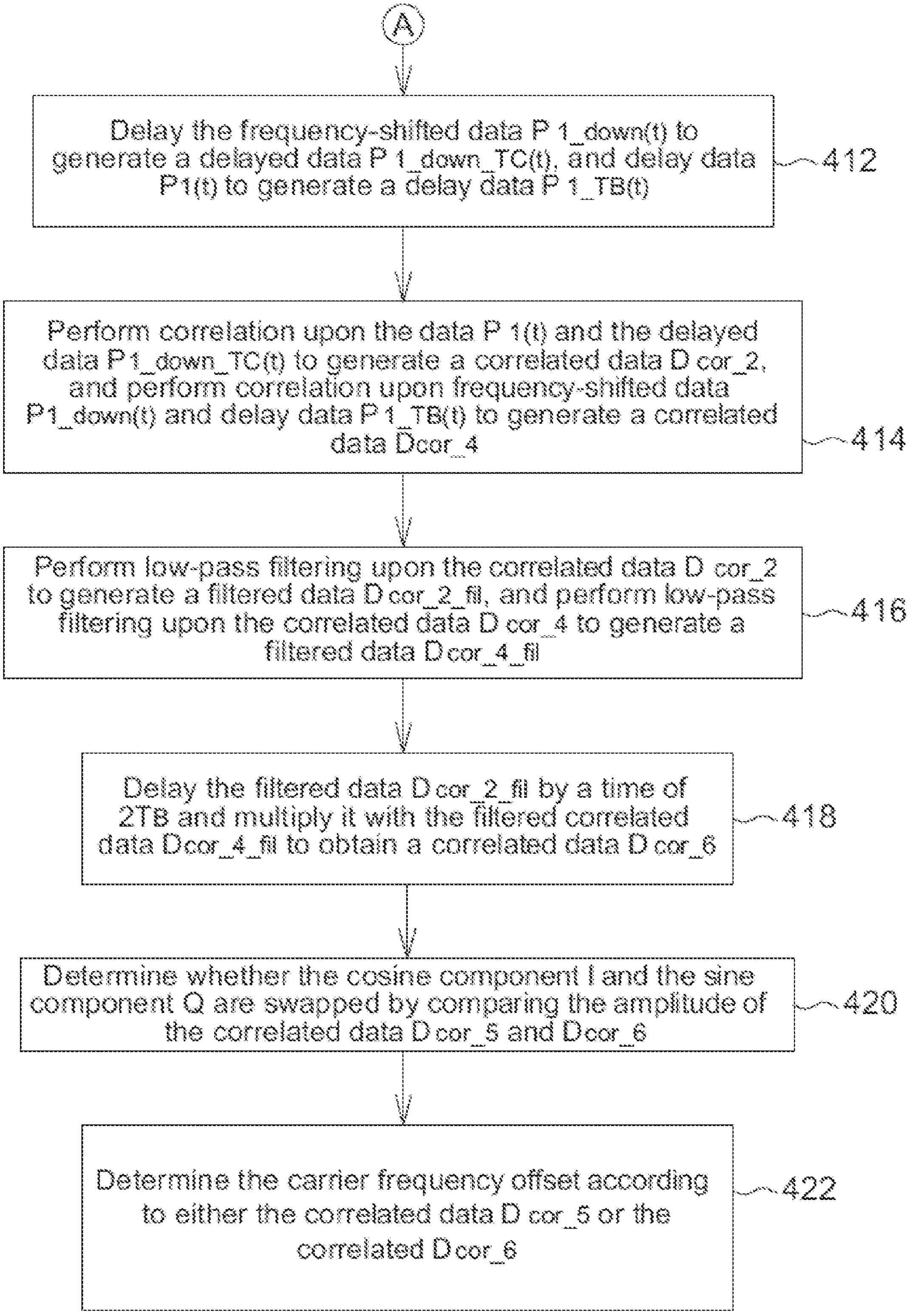

Operation details of the circuit 100 shall be described below. Also with reference to FIG. 1, FIGS. 4*a* and 4*b* are flowcharts of a method for detecting a digital data stream according to an embodiment of the present disclosure. Note that provided same results are substantially achieved, the steps according to the present disclosure need not be performed as sequences shown in FIGS. 4*a* and 4*b*.

Referring to FIGS. 4*a* and 4*b*, in Step 400, the frequency shifter 111 in the first detecting circuit 110 performs frequency shifting upon a digital data stream. In the description below, suppose the circuit 100 is currently processing a P1 symbol $P_1(t)*\exp(j2\pi f_0 t)$ in the digital data stream, wherein $f_0$ is the frequency offset of the digital data stream. After the frequency shifter 111 performs frequency shifting upon the data $P_1(t)*\exp(j2\pi f_0 t)$, a frequency-shifted data $P_{1\_up}(t)$ with a frequency offset $f_{sh}$ of 1/2024T is generated, where T is a sampling cycle of the digital data stream. Suppose at this point, the cosine component I and the sine component are swapped, i.e., the data of the P1 symbol is in fact $j[P_1(t)*\exp(j2\pi f_0 t)]^*$, the frequency-shifted data $j[P_1(t)*\exp(j2\pi f_0 t)]^*$ is then represented as:

$$P_{1\_up}(t)=jP_1^*(t)e^{j2\pi(-f0+fsh)t} \tag{1}$$

In Step 402, the delay unit 112 delays the frequency-shifted data $P_{1\_up}(t)$ to generate a delayed data $P_{1\_up\_TC}(t)$, where $T_C$ represents the delay, i.e., 542 samples. The delay unit 116 delays the data $P_1(t)*\exp(j2\pi f_0 t)$ of the P1 symbol to generate a delayed data $P_{1\_TB}(t)$, where $T_B$ represents the delay, i.e., 482 samples. The delayed data $P_{1\_up\_TC}(t)$ and $P_{1\_TB}(t)$ are respectively represented as:

$$P_{1\_up\_TC}(t)=jP_1^*(t-T_c)e^{j2\pi(-f0+fsh)(t-T_c)} \tag{2}$$

$$P_{1\_TB}(t)=jP_1^*(t-T_B)e^{-j2\pi f0(t-T_B)} \tag{3}$$

In Step 404, the correlator 113 correlates the data $P_1(t)*\exp(j2\pi f_0 t)$ and the delayed data $P_{1\_up\_TC}(t)$ to generate a correlated data $D_{cor\_1}$, and the correlator 117 correlates the frequency-shifted data $P_{1\_up}(t)$ and the delayed data $P_{1\_TB}(t)$ to generate a correlated data $D_{cor\_3}$. The correlated data $D_{cor\_1}$ and $D_{cor\_3}$ are respectively represented as:

$$D_{cor\_1}=P_1^*(t)P_1(t-T_c)e^{-j2\pi f0T_c}e^{-j2\pi fsh(t-T_c)} \tag{4}$$

$$D_{cor\_3}=P_1^*(t)P_1(t-T_B)e^{j2\pi fsh t}e^{-j2\pi f0T_B} \tag{5}$$

In Step 406, the filter 114 performs low-pass filtering upon the correlated data $D_{cor\_1}$ to generate a filtered correlated data $D_{cor\_1\_fil}$, and the filter 118 performs low-pass filtering upon the correlated data $D_{cor\_3}$ to generate a filtered correlated data $D_{cor\_3\_fil}$. The correlated data $D_{cor\_1\_fil}$ at a time point $t \in [2T_C, T_C+T_R]$ and $D_{cor\_3\_fil}$ at a time point $t \in [2T_C+2T_B, 2T_C+T_B+T_R]$ are respectively represented as:

$$D_{cor\_1\_fil}=c_1 \cdot^{-j2\pi f0T_C}+N_{i1} \tag{6}$$

$$D_{cor\_3\_fil}=c_2 \cdot e^{-j2\pi f0T_B}+N_{i2} \tag{7},$$

where $c_1$ and $c_2$ are constants and $N_{i1}$ and $N_{i2}$ are noise.

In Step 408, the filtered correlated data $D_{cor\_1\_fil}$ is delayed by a time of $2T_B$ by the delayed unit 115 and then multiplied with the filtered correlated data $D_{cor\_3\_fil}$ to obtain a correlated data $D_{cor\_5}$. The correlated data $D_{cor\_5}$ at a time point $t \in [2T_C+T_A, 2T_C+T_R+T_A]$ is represented as:

$$D_{cor\_5}=c_1c_2 \cdot e^{-j2\pi f0(T_C+T_B)}+N_{i3} \tag{8},$$

where $N_{i3}$ is noise.

In Step 410, the frequency shifter 121 in the second detecting circuit 120 performs frequency shifting upon the data $P_1(t)*\exp(j2\pi f_0 t)$ of the P1 symbol. Note that the second detecting circuit 120 is synchronized with the first detecting circuit 110; that is, the second detecting circuit 120 and the first detecting circuit 110 at the same time receive a same signal. The frequency shifter 121 performs frequency shifting upon the data $P_1(t)*\exp(j2\pi f_0 t)$ to generate a frequency-shifted data $P_{1\_down}(t)$ having a frequency offset $f_{sh}$ of $(-1/1024T)$, where T is a sampling cycle of the digital data stream. Suppose at this point the cosine component I and the sine component Q are not swapped, i.e., the P1 symbol is $P_1(t)*\exp(j2\pi f_0 t)$, the frequency-shifted data $P_{1\_down}(t)$ is represented as:

$$P_{1\_down}(t)=P_1(t)e^{j2\pi(f_0-f_{sh})t} \quad (9)$$

In Step 412, the delay unit 122 delays the frequency-shifted data $P_{1\_down}(t)$ to generate a delayed data $P_{1\_down\_TC}(t)$, where $T_C$ represents the delay, i.e., 542 samples. The delay unit 126 delays the data $P_1(t)*\exp(j2\pi f_0 t)$ of the P1 symbol to generate a delayed data $P_{1\_TB}(t)$, where $T_B$ represents the delay, i.e., 482 samples. The delayed data $P_{1\_down\_TC}(t)$ and $P_{1\_TB}(t)$ are respectively represented as:

$$P_{1\_down\_TC}(t)=P_1(t-T_c)e^{j2\pi(f_0-f_{sh})(t-T_c)} \quad (10)$$

$$P_{1\_TB}(t)=P_1(t-T_B)e^{j2\pi f_0(t-T_B)} \quad (11)$$

In Step 414, the correlator 123 correlates the data $P_1(t)*\exp(j2\pi f_0 t)$ and the delayed data $P_{1\_up\_TC}(t)$ to generate a correlated data $D_{cor\_2}$, and the correlator 127 correlates the frequency-shifted data $P_{1\_down}(t)$ and the delayed data $P_{1\_TB}(t)$ to generate a correlated data $D_{cor\_4}$. The correlated data $D_{cor\_2}$ and $D_{cor\_4}$ are respectively represented as:

$$D_{cor\_2}=P_1(t)P_1{}^*(t-T_c)e^{j2\pi f_0 T_c}e^{j2\pi f_{sh}(t-T_c)} \quad (12)$$

$$D_{cor\_4}=P_1(t)P_1{}^*(t-T_B)e^{-j2\pi f_{sh}t}e^{j2\pi f_0 T_B} \quad (13)$$

In Step 416, the filter 124 performs low-pass filtering upon the correlated data $D_{cor\_2}$ to generate a filtered correlated data $D_{cor\_2\_fil}$, and the filter 128 performs low-pass filtering upon the correlated data $D_{cor\_4}$ to generate a filtered correlated data $D_{cor\_4\_fil}$. The filtered correlated data $D_{cor\_2\_fil}$ at a time point $t\in[2T_C, T_C+T_R]$ and the filtered correlated data $D_{cor\_4\_fil}$ at a time point $t\in[2T_C+2T_B, 2T_C+T_B+T_R]$ are respectively represented as:

$$D_{cor\_2\_fil}=c_1\cdot e^{j2\pi f_0 T_C}+N_{i1} \quad (14)$$

$$D_{cor\_4\_fil}=c_2\cdot e^{j2\pi f_0 T_B}+N_{i2} \quad (15),$$

where $c_1$ and $c_2$ are constants and $N_{i1}$ and $N_{i2}$ are noise.

In Step 418, the filtered correlated data $D_{cor\_2\_fil}$ is delayed by a time of $2T_B$ by the delayed unit 125 and then multiplied with the filtered correlated data $D_{cor\_4\_fil}$ to obtain a correlated data $D_{cor\_6}$. The correlated data $D_{cor\_6}$ at a time point $t\in[2T_C+T_A, 2T_C+T_R+T_A]$ is represented as:

$$D_{cor\_6}=c_1c_2\cdot e^{j2\pi f_0(T_C+T_B)}+N_{i3} \quad (16),$$

where $N_{i3}$ is noise.

Figure 5:
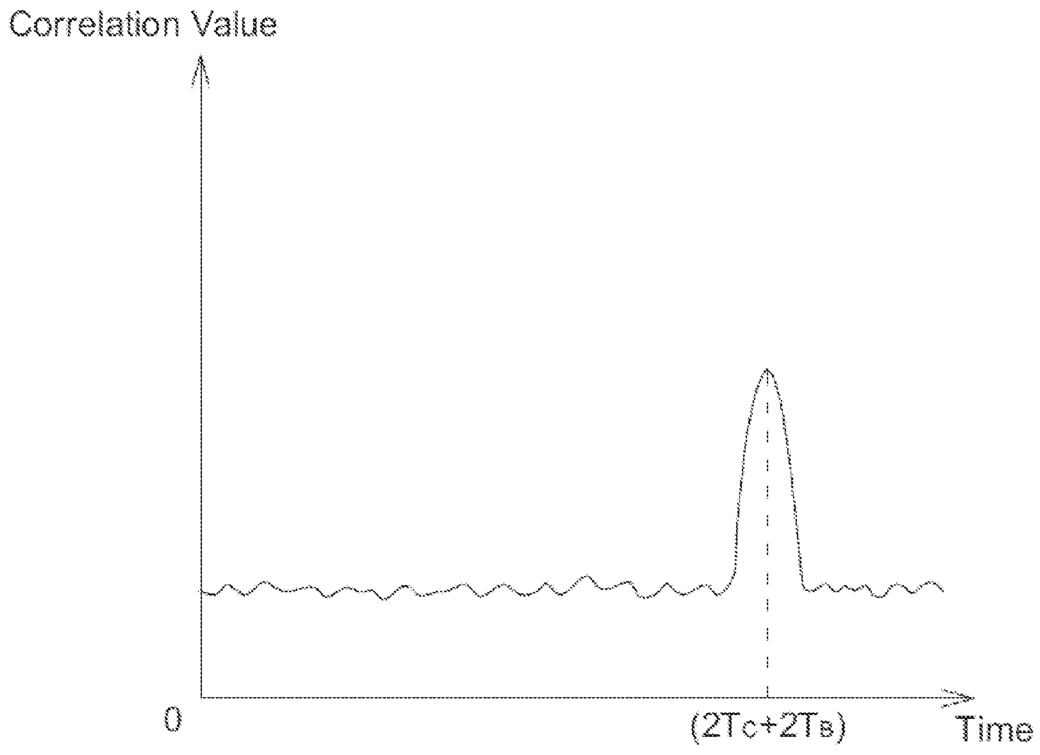
FIG. 5 is a schematic diagram of a correlated data outputted by a first detecting circuit or the second detecting circuit.

More details on the correlated data $D_{cor\_5}$ and $D_{cor\_6}$ respectively generated by the first detecting circuit 110 and the second detecting circuit 120 shall be given below. When the cosine component I and the sine component Q are not swapped, at a time point $t=2T_C+2T_B$, while no noticeable difference is observed at an amplitude of the correlated data $D_{cor\_5}$ outputted by the first detecting circuit 110, the correlated data $D_{cor\_6}$ outputted by the second detecting circuit 120 shows a peak as depicted in FIG. 5 (supposing that the circuit 100 starts to receive the beginning of the data $P_1(t)$ of the P1 symbol at a time t=0), with the amplitude of the peak being as stated by Equation (16). On the contrary, when the cosine component I and the sine component Q in the digital data stream are swapped, at a time point $t=2T_C+2T_B$, while no noticeable difference is observed at amplitude of the correlated data $D_{cor\_6}$ outputted by the second detecting circuit 120, the correlated data $D_{cor\_5}$ outputted by the first detecting circuit 110 shows a peak, with the amplitude of the peak being as stated by Equation (8).

Therefore, in Step 420, by comparing the amplitude of the correlated data $D_{cor\_5}$ and $D_{cor\_6}$, the decision unit 130 determined whether the cosine component I and the sine component Q are swapped and accordingly generates an output signal $V_{out\_1}$ to the multiplexer 320 to determine transmission paths.

After the determining whether the cosine component I and the sine component Q are swapped, in Step 422, the decision unit 130 selects either the correlated data $D_{cor\_5}$ or the correlated $D_{cor\_6}$, and determines the carrier frequency offset, i.e., the foregoing $f_0$, according to the numbers of samples in the data C and B of the P1 symbol and a phase angle of the selected correlated data, i.e., either $D_{cor\_5}$ or $D_{cor\_6}$.

More specifically, suppose the digital data stream contains a carrier frequency offset $f_0$, and the cosine component I and the sine component Q in the digital data stream are swapped, the correlated data $D_{cor\_5}$ outputted by the first detecting circuit 110 at a time point $t=2T_C+2T_B$ is $c_1*\exp(-2\pi f_0(T_C+T_B))$. The carrier frequency offset $f_0$ in the digital data stream is thus:

$$f_0 = -\frac{\theta}{2\pi(T_C+T_B)},$$

where θ is a phase angle of the correlated data $D_{cor\_5}$ at a time point $t=2T_C+2T_B$. On the other hand, suppose the digital data stream contains a carrier frequency offset $f_0$, and the cosine component I and the sine component Q in the digital data stream are not swapped, the correlated data $D_{cor\_6}$ outputted by the second detecting circuit 120 at a time point $t=2T_C+2T_B$ is $c_1*\exp(2\pi f_0(T_C+T_B))$. The carrier frequency offset $f_0$ in the digital data stream is thus:

$$f_0 = \frac{\theta}{2\pi(T_C+T_B)},$$

where θ is a phase angle of the correlated data $D_{cor\_6}$ at a time point $t=2T_C+2T_B$.

Further, the circuit 100 may also be implemented for quickly retrieving the P1 symbol from the digital data stream. More specifically, suppose the cosine component I and the sine component Q are swapped, a peak is reflected at a time point $t=2T_C+2T_B$ on the waveform of the correlated data $D_{cor\_5}$ outputted by the first detecting circuit 110. Therefore, a time point where the peak occurs on the waveform of the correlated data $D_{cor\_5}$ outputted by the first detecting circuit 110 is first detected, and a start position of the data $P_1(t)$ of the P1 symbol is then determined by going back a time of $2T_C+2T_B$ from the detected time point, so as to retrieve the P1 symbol and transmit the retrieved P1 symbol to a subsequent processing unit for demodulation. On the contrary, suppose the cosine component I and the sine component Q are not swapped, a peak is reflected at a time point $t=2T_C+2T_B$ on the waveform of the correlated data $D_{cor\_6}$ outputted by the second detecting circuit 120. Therefore, a time point where the peak occurs on the waveform of the correlated data $D_{cor\_6}$ outputted by the second detecting circuit 110 is first detected, and a start position of the data $P_1(t)$ of the P1 symbol is then determined by going back a time of $2T_C+2T_B$ from the detected time point, so as to retrieve the P1 symbol and transmit the retrieved P1 symbol to a subsequent processing unit for demodulation.

It is to be noted that, the embodiment shown in FIG. 1 is implemented in the DVB-T2 system, and the circuit 100 applied for detecting whether the cosine and sine components in the digital data stream in the DVB-T2 system are IQ-swapped, as well as for estimating a carrier frequency offset of the digital data stream. However, the circuit according to the present disclosure may also be applied to other systems that process a structure as the P1 symbol in the digital data stream shown in FIG. 2. That is, the circuit according to the present disclosure is applicable for detecting a digital data stream comprising a plurality of data frames, each of which having a predetermined symbol at a beginning thereof The predetermined symbol is similar to the P1 symbol, as having a first data, a second data, a third data and a fourth data; and the first data is generated by performing a predetermined operation upon the second data, and the fourth data is generated by performing a predetermined operation upon the third data. Further, the predetermined symbol contains certain information for demodulating the digital data stream, such information of an FFT mode needed by data modulation and information of whether an antenna transceiving mode is multiple input or single input.

In others embodiments according to the present disclosure, the first detecting circuit 110 and the second detecting circuit 120 may also output corresponding correlated data via a single path. For example, in one embodiment of the present disclosure, the delay units 112 and 115, the correlator 113, the filter 114 and the multiplier 119 in the first detecting circuit 110, and the delay units 122 and 125, the correlator 123, the filter 124 and the multiplier 129 in the second detecting circuit 120 shown in FIG. 1 may be removed, and the decision unit 130 determines whether the cosine and sine components in the digital data stream are IQ-swapped directly according to the filtered correlated data $D_{cor\_3\_fil}$ from the filter 118 and the filtered correlated data $D_{cor\_4\_fil}$ from the filter 128. In another embodiment of the present disclosure, the delay units 115 and 116, the correlator 117, the filter 118 and the multiplier 119 in the first detecting circuit 110, and the delay units 125 and 126, the correlator 127, the filter 128 and the multiplier 129 in the second detecting circuit 120 may be removed, and the decision unit 130 determines whether the cosine and sine components in the digital data stream are IQ-swapped directly according to the filtered correlated data $D_{cor\_1\_fil}$ from the filter 114 and the filtered correlated data $D_{cor\_2\_fil}$ from the filter 124. Note that the above modifications are within the scope of the present disclosure.

In conclusion, according to the circuit for detecting a digital data stream and an associated method thereof, within a relatively short period, a location of a P1 symbol in a digital data stream is detected, whether a cosine component and a sine component in a digital data stream are IQ-swapped are detected, and a carrier frequency offset of the digital data stream is estimated all at the same time, thereby enhancing signal processing performance of a receiver.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A circuit for detecting a digital data stream comprising a predetermined symbol having a first data and a second data, the first data being generated by performing frequency shifting upon the second data, the circuit comprising:

a first detecting circuit that detects a correlation between a first frequency-shifted data and the second data to generate a first correlated data, the first frequency-shifted data being generated by performing first frequency shifting upon the second data;

a second detecting circuit that detects a correlation between a second frequency-shifted data and the second data to generate a second correlated data, the second frequency-shifted data being generated by performing second frequency shifting upon the second data, the first data comprising the first frequency-shifted data and the second frequency-shifted data; and a decision unit that determines a signal status of the digital data stream according to the first and second correlated data.

2. The circuit as claimed in claim 1, wherein a frequency offset of the second frequency shifting is conjugation of a frequency offset of the first frequency shifting.

3. The circuit as claimed in claim 1, wherein the first detecting circuit comprises:

a first frequency shifter that performs the first frequency shifting upon the second data to generate the first frequency-shifted data;

a first correlator that correlates the first frequency-shifted data and the second data to generate the first correlated data; and a filter that filters the first correlated data according to a first window length to generate a filtered first correlated data;

the second detecting circuit comprises:

a second frequency shifter that performs the second frequency shifting upon the second data to generate the second frequency-shifted data;

a second correlator that correlates the second frequency-shifted data and the second data to generate the second correlated data; and a second filter that filters the second correlated data according to a second window length to generate a filtered second correlated data; and the decision unit determines the signal status of the digital data stream according to at least the filtered first correlated data and the filtered second correlated data.

4. The circuit as claimed in claim 3, wherein the decision unit determines whether cosine and sine components in the digital data stream are IQ-swapped according to at least the filtered first correlated data and the filtered second correlated data.

5. The circuit as claimed in claim 4, wherein the decision unit determines whether the cosine and sine components in the digital data stream are IQ-swapped according to at least amplitudes at peaks of the filtered first correlated data and the filtered second correlated data.

6. The circuit as claimed in claim 5, wherein the decision unit determines that the cosine and sine components in the digital data stream are IQ-swapped when the amplitude at the peak of the filtered first correlated data is greater than the amplitude at the peak of the filtered second correlated data, and determines that the cosine and sine components in the digital data stream are not IQ-swapped when the amplitude at the peak of the filtered first correlated data is smaller than the amplitude at the peak of the filtered second correlated data.

7. The circuit as claimed in claim 3, wherein the predetermined symbol further comprises a third data and a fourth data, the fourth data is generated by performing frequency shifting upon the third data, the first frequency shifter in the first detecting circuit performing the first frequency shifting upon the fourth data to generate a third frequency-shifted data;

the circuit further comprises:

a third correlator that correlates the third data and the third frequency-shifted data to generate a third correlated data; and a third filter that filters the third correlated data according to a second window length to generate a filtered third correlated data;

the second frequency shifter in the second detecting circuit performs the second frequency shifting upon the fourth data to generate a fourth frequency shifted data;

the circuit further comprises:

a fourth correlator that correlates the third data and the fourth frequency shifted data to generate a fourth correlated data; and a fourth filter that filters the fourth correlated data according to the second window length to generate a filtered fourth correlated data; and the decision unit determines whether the cosine and sine components in the digital data stream are IQ-swapped according to at least the filtered first, second, third and fourth correlated data.

8. The circuit as claimed in claim 7, wherein the first detecting circuit further comprises:

a first delay unit that delays the filtered first correlated data to generate a delayed first correlated data; and a multiplier that multiplies the delayed first correlated data with the third correlated data to obtain a fifth correlated data;

the second detecting circuit further comprises:

a second delay unit that delays the filtered second correlated data to generate a delayed second correlated data; and a second multiplier that multiplies the delayed second correlated data with the fourth correlated data to obtain a sixth correlated data; and the decision unit determines whether the cosine and sine components in the digital data stream are IQ-swapped according to the fifth and sixth correlated data, selects either the fifth correlated data or the sixth correlated data according to whether the cosine and sine components in the digital data stream are IQ-swapped, and determines a carrier frequency offset of the digital data stream according to a number of samples of the first or second data, a number of samples of the third or fourth data, and a phase angle of the selected fifth or sixth correlated data.

9. The circuit as claimed in claim 8, wherein the decision unit selects either the fifth or sixth correlated data according to whether the cosine and sine components in the digital data stream are IQ-swapped, and determines the carrier frequency offset according to a sum of the numbers of the first and third data, and the phase angle of the selected fifth or sixth correlated data.

10. A method for detecting a digital data stream comprising a predetermined symbol having a first data and a second data, the first data being generated by performing frequency shifting upon the second data, the method comprising:

calculating a correlation between a first frequency-shifted data and the second data to generate a first correlated data, the first frequency-shifted data being generated by performing first frequency shifting upon the second data;

calculating a correlation between a second frequency-shifted data and the second data to generate a second correlated data, the second frequency-shifted data being generated by performing second frequency shifting upon the second data, the first data comprising the first frequency-shifted data and the second frequency-shifted data; and determining a signal status of the digital data stream according to the first and second correlated data.

11. The method as claimed in claim 10, wherein a frequency offset of the second frequency shifting is conjugation of a frequency offset of the first frequency shifting.

12. The method as claimed in claim 10, wherein the step of calculating the correlation between the first frequency-shifted data and the second data to generate the first correlated data further comprises:

filtering the first correlated data according to a first window length to generate a filtered first correlated data;

the step of calculating the correlation between the second frequency-shifted data and the second data to generate the second correlated data further comprises:

filtering the second correlated according to the first window length to generate a filtered second correlated data; and the step of determining the signal status of the digital data stream further comprises:

determining the signal status of the digital data stream according to at least the filtered first and second correlated data.

13. The method as claimed in claim 11, wherein the step of determining the signal status of the digital data stream according to at least the filtered first and second correlated data further comprises:

determining whether cosine and sine components in the digital data stream are IQ-swapped according to at least the filtered first and second correlated data.

14. The method as claimed in claim 12, wherein the step of determining whether the cosine and sine components in the digital data stream are IQ-swapped further comprises:

determining whether the cosine and sine components in the digital data stream are IQ-swapped according to at least an amplitude at a peak of the filtered first correlated data and an amplitude at a peak of the filtered second correlated data.

15. The method as claimed in claim 14, wherein it is determined that the cosine and sine components in the digital data stream are IQ-swapped when the amplitude at the peak of the filtered first correlated data is greater than the amplitude at the peak of the filtered second correlated data, and it is determined that the cosine and sine components in the digital data stream are not IQ-swapped when the amplitude at the peak of the filtered first correlated data is smaller than the amplitude at the peak of the filtered second correlated data.

16. The method as claimed in claim 13, the predetermined symbol further comprising a third data and a fourth data, the fourth data being generated by performing frequency shifting upon the third data, the method further comprising:

performing the first frequency shifting upon the fourth data to generate a third frequency-shifted data;

correlating the third data and the third frequency-shifted data to generate a third correlated data;

filtering the third correlated data according to a second window length to generate a filtered third correlated data;

performing the second frequency shifting upon the fourth data to generate a fourth frequency-shifted data;

correlating the third data and the fourth frequency-shifted data to generate a fourth correlated data; and filtering the fourth correlated data according to the second window length to generate a filtered fourth correlated data;

wherein, the step of determining whether the cosine and sine components in the digital data stream are IQ-swapped determines whether the cosine and sine components in the digital data stream are IQ-swapped according to at least the filtered first, second, third and fourth correlated data.

17. The method as claimed in claim 16, further comprising:

delaying the filtered first correlated data to generate a delayed first correlated data;

multiplying the delayed first correlated data with the third correlated data to obtain a fifth correlated data;

delaying the filtered second correlated data to generate a delayed second correlated data; and multiplying the delayed second correlated data with the fourth correlated data to obtain a sixth correlated data;

wherein, the step of determining whether the cosine and sine components in the digital data stream are IQ-swapped comprises:

determining whether the cosine and sine components in the digital data stream are IQ-swapped according to the fifth and sixth correlated data;

selecting either the fifth or sixth correlated data according to whether the cosine and sine components in the digital data stream are IQ-swapped; and determining a carrier frequency offset of the digital data stream according to a number of samples of the first or second data, a number of samples of the third or fourth data, and a phase angle of the selected fifth or sixth correlated data.

18. The method as claimed in claim 17, wherein the step of determining the carrier frequency offset of the digital data stream comprises:

selecting either the fifth or sixth correlated data according to whether the cosine and sine components in the digital data stream are IQ-swapped; and determining the carrier frequency offset of the digital data stream according to a sum of the first and third data, and the phase angle of the selected fifth or sixth correlated data.

* * * * *